US011347135B1

(12) United States Patent
Xu

(10) Patent No.: US 11,347,135 B1
(45) Date of Patent: May 31, 2022

(54) DOUBLE-SIDED ON-CAMERA LIGHT

(71) Applicant: ZhiSheng Xu, Philadelphia, PA (US)

(72) Inventor: ZhiSheng Xu, Philadelphia, PA (US)

( * ) Notice: Subject to any disclaimer, the term of this patent is extended or adjusted under 35 U.S.C. 154(b) by 0 days.

(21) Appl. No.: 17/320,346

(22) Filed: May 14, 2021

(51) Int. Cl.
G03B 15/05 (2021.01)
G03B 17/56 (2021.01)

(52) U.S. Cl.
CPC ........... *G03B 15/05* (2013.01); *G03B 17/566* (2013.01); *G03B 2215/056* (2013.01); *G03B 2215/0567* (2013.01); *G03B 2215/0575* (2013.01)

(58) Field of Classification Search
CPC ................ G02B 2215/0567; G02B 2215/0575
See application file for complete search history.

(56) References Cited

U.S. PATENT DOCUMENTS

| 10,295,887 | B2* | 5/2019 | Yang | G03B 15/02 |
| 2011/0222286 | A1* | 9/2011 | Oba | H05K 1/189 |
| | | | | 362/249.04 |
| 2012/0243860 | A1* | 9/2012 | Yang | G03B 17/566 |
| | | | | 396/199 |
| 2015/0062862 | A1* | 3/2015 | Baxter | F21V 29/74 |
| | | | | 362/6 |
| 2019/0377246 | A1* | 12/2019 | Boerup | F16M 13/00 |

OTHER PUBLICATIONS

Viltrox "Viltrox VL-162T CRI95+ LED Video Light, Portable Camera Photo Light Panel Dimmable for DSLR Camera Camcorder with Battery, Charger, High Brightness, 3300K-5600K Bi-Color, White Filter and LCD Display" https://www.amazon.com/VILTROX-Portable-Camcorder-Brightness-3300K-5600K/dp/B07C9ZNY17/ (Year: 2018).*
Pixel "Pixel G1s RGB Video Light, Built-in 12W Rechargeable Battery LED Camera Light Full Color 12 Common Light Effects, CRI≥97 2500-8500K LED Video Light Panel with Aluminum Alloy Body" https://www.amazon.com/Rechargeable-Battery-Effects-2500-8500K-Aluminum/dp/B083SCPFQK (Year: 2020).*
Raleno "Raleno Led Video Light, Built-in Rechargeable Battery on Camera Light, 3200K-5600K Bi-Color Dimmable, CRI95+, with Hot Shoe Ball Mount, USB Cable Video Lighting for YouTube, Children,Wedding Shooting" https://www.amazon.com/dp/B07FL2ZFFS/ (Year: 2018).*
Lightdow "Lightdow48 Pieces Macro LED Ring Flash Light with LCD Screen Display for Canon Nikon Sony DSLR Cameras" https://www.amazon.com/Lightdow-Pieces-Screen-Display-Cameras/dp/B00VWGZ2J0/ (Year: 2015).*
Ploture "Ploture Flash Light with LCD Display Adapter Rings and Flash Diff-Users Works with Canon Nikon and Other DSLR Cameras" https://www.amazon.com/PLOTURE-Display-Adapter-Diff-Users-Cameras/dp/B07D7NGX87 (Year: 2018).*

* cited by examiner

*Primary Examiner* — Clayton E. LaBalle
*Assistant Examiner* — Diana Hancock
(74) *Attorney, Agent, or Firm* — Benjamin Aaron Adler

(57) ABSTRACT

Provided herein is an on-camera light or a double-sided light for a camera. Both the on-camera light and the double-sided light have a hollow body with a front light-transmitting surface and a back light-transmitting surface and a plurality of light emitting diodes attached to a pair of circuit boards disposed within the hollow body. A control board is operably connected to the pair of LED circuit boards, to a power source, which is connected to a switch, to a brightness adjustment knob, and to a display. The on-camera light has a camera mount, for example, a cold shoe head with a male mounting foot for attachment on a camera.

9 Claims, 3 Drawing Sheets

DOUBLE-SIDED ON-CAMERA LIGHT

BACKGROUND OF THE INVENTION

Field of the Invention

The present invention relates to the field of photography and videography. More particularly, the present invention relates to on-camera light emitting diode (LED) devices used for illumination during a photographic or videographic opportunity.

Description of the Related Art

On-camera lights are used to provide supplementary lighting to a scene and/or subject when taking still or video photography. Light emitting diodes (LEDs) have largely replaced incandescent lamps in such photographic accessories due to low power consumption and higher operational life for LEDs. Light emitting diodes (LEDs) work on the principle of passing a current through semiconductors. Through the combination of electrons and holes, excess energy is released in the form of light to achieve the effect of light emission.

LEDs have many advantages in the field of lighting due to their longer life expectancy, low power consumption, fast response time, small size, and light weight. In addition to their easily controllable dimming characteristics, they are available in a variety of colors. Moreover, the components required to manufacture LEDs do not contain environmental pollutants like mercury and lead that pollute the environment.

Two main types of LEDs are used in lighting systems, i.e., Surface Mounted Device (SMD) LEDs, which have flooding and light performance features and Direct In-line Package (DIP) LEDs (also called straw hat lamp LEDs), which demonstrate high brightness and condensing performance. Commercially available LED lights for camera lighting, while efficient, have several disadvantages, including fixed brightness and the ability to emit light in only one direction, which limits their ability to adapt to the lighting requirements of different environments. Moreover, only one type of LED is used in these on-camera lights, which additionally limits the potential range of lighting performance to one of either flood lighting or condensed lighting.

There is, therefore, a need in the art for an on-camera light with improved performance. Particularly, the art is deficient in a double-sided on-camera light that is usable at any brightness and movable in any direction and that combines the properties of both plug-in lamp beads and patch lamp beads. The present invention fulfills this long-standing need and desire in the art.

SUMMARY OF THE INVENTION

The present invention is directed to an on-camera light. The on-camera light has a hollow body with a front light transmitting surface and a back light transmitting surface. A first light emitting diode (LED) circuit board comprising a plurality of LEDs is disposed within the hollow body proximate to the front light transmitting surface and a second light emitting diode (LED) circuit board comprising a plurality of light emitting diodes (LEDs) is disposed within the hollow body proximate to the back light transmitting surface. A camera mount is attached to the hollow body. The on-camera light comprises means for operating the on-camera light.

The present invention also is directed to a double-sided light for a camera. The double-sided light has a hollow body substantially circular in shape and has a front light-transmitting surface and a back light-transmitting surface. A pair of light emitting diode (LED) circuit boards each comprising a plurality of LEDs is disposed within the hollow body between the front light-transmitting surface and the back light-transmitting surface and proximate thereto. A control board is disposed within the hollow body and is operably connected to the pair of LED circuit boards, a power source disposed within the hollow body and a switch disposed on an outer surface of the hollow body and in electrical communication with the power source. A camera mount is attached to the hollow body.

The present invention is directed to a related double-sided light for a camera further comprising a brightness adjustment knob disposed on an outer surface of the hollow body and operably connected to the control board. The present invention is directed to another related double-sided light for a camera further comprising a display disposed on an outer surface of the hollow body and operably connected to the control board.

Other and further aspects, features, benefits, and advantages of the present invention will be apparent from the following description of the presently preferred embodiments of the invention given for the purpose of disclosure.

BRIEF DESCRIPTION OF THE FIGURES

So that the matter in which the above-recited features, advantages and objects of the invention, as well as others which will become clear, are attained and can be understood in detail, more particular descriptions and certain embodiments of the invention briefly summarized above are illustrated in the appended drawings. These drawings form a part of the specification. It is to be noted, however, that the appended drawings illustrate preferred embodiments of the invention and therefore are not to be considered limiting in their scope.

DETAILED DESCRIPTION OF THE INVENTION

Figure 1:
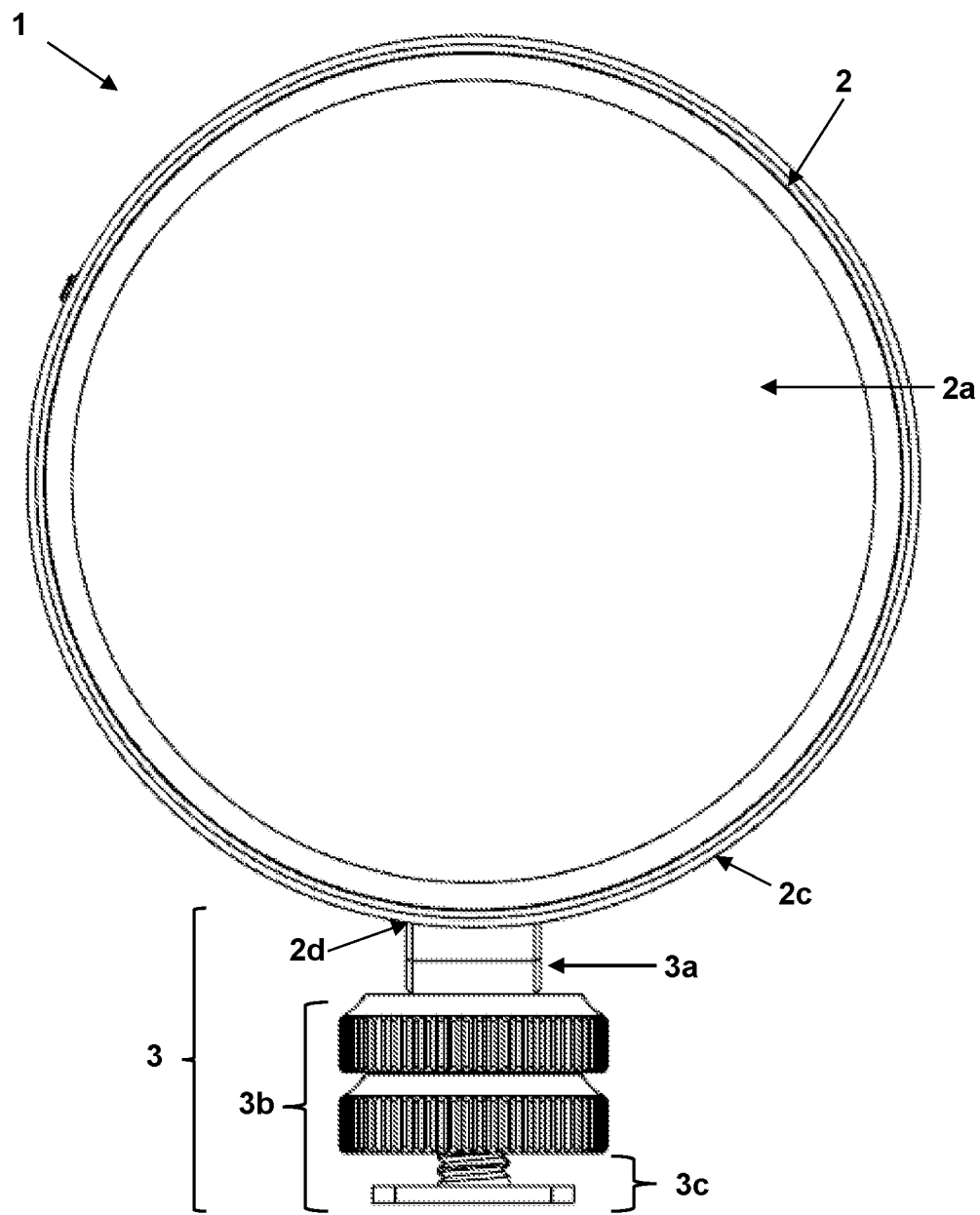
FIG. 1 shows the on-camera light.

As used herein, "a" or "an" may mean one or more. As used herein in the claim(s), when used in conjunction with the word "comprising", the words "a" or "an" may mean one or more than one.

As used herein, the term "or" in the claims is used to mean "and/or" unless explicitly indicated to refer to alternatives only or the alternatives are mutually exclusive, although the disclosure supports a definition that refers to only alternatives and "and/or."

As used herein "another" or "other" may mean at least a second or more of the same or different claim element or components thereof. Similarly, the word "or" is intended to include "and" unless the context clearly indicates otherwise.

As used herein, "comprise" or "comprises" or "comprising", except where the context requires otherwise due to express language or necessary implication, are used in an inclusive sense, i.e. to specify the presence of the stated features but not to preclude the presence or addition of further features in various embodiments of the invention.

As used herein, "including", "which includes" or "that includes" is also an open term that also means including at least the elements/features that follow the term, but not excluding others. Thus, including is synonymous with and means comprising.

As used herein, the ordinal adjectives "first" and "second", unless otherwise specified are used to describe a common object, merely indicate that different instances of like objects are being referred to, and are not intended to imply that the objects so described must be in a given sequence, either temporally, spatially, in ranking, or in any other manner. Moreover, as used herein, "first light emitting diode (LED) circuit board and second light emitting diode (LED) circuit board", "first LED circuit board and second LED circuit board", "first and second LED circuit boards", "pair of light emitting diode (LED) circuit boards", "pair of LED circuit boards", and "circuit boards" are interchangeable.

As used herein, "on-camera light", "double-sided light for a camera" and "double-sided light" are interchangeable.

In one embodiment of the present invention there is provided an on-camera light, comprising a hollow body comprising a front light-transmitting surface and a back light-transmitting surface; a first light emitting diode (LED) circuit board comprising a plurality of LEDs disposed within the hollow body proximate to the front light transmitting surface thereof; a second light emitting diode (LED) circuit board comprising a plurality of light emitting diodes (LEDs) disposed within the hollow body proximate to the back light transmitting surface thereof; a camera mount attached to the hollow body; and means for operating the on-camera light.

In this embodiment the means for operating the light comprises a control board removably secured within the hollow body and operably connected to the first LED circuit board and the second LED circuit board; a switch attached on an outer surface of the hollow body and operably connected to the control board; and a power source disposed within the hollow body and operably connected to the control board and to the switch. Further to this embodiment the power source may be a rechargeable battery where the hollow body further comprises a charging port disposed on an outer surface of the hollow body and operably connected to the rechargeable battery. In another further embodiment the on-camera light comprises a brightness adjustment knob disposed on an outer surface of the hollow body and operably connected to the control board. In yet another further embodiment the on-camera light comprises a display positioned on an outer surface of the hollow body and operably connected to the control board.

In all embodiments of this invention the plurality of LEDs on the first LED circuit board may be different from the plurality of LEDs on the second LED circuit board. Particularly the plurality of the LEDs may comprise plug-in lamp beads or patch lamp beads. Also in all embodiments the first light-transmitting surface and the second light-transmitting surface independently may be transparent or translucent.

In all embodiments the camera mount may be a pan-tilt cold shoe head. Also, the camera mount may be a pan-tilt cold shoe head. In addition the hollow body may have a substantially circular shape. Furthermore, the hollow body may be made of an aluminum alloy.

In another embodiment of the present invention there is provided a double-sided light for a camera, comprising a hollow body substantially circular in shape and comprising a front light-transmitting surface and a back light-transmitting surface; a pair of light emitting diode (LED) circuit boards each comprising a plurality of LEDs disposed within the hollow body between the front light-transmitting surface and the back light-transmitting surface and proximate thereto; a control board disposed within the hollow body and operably connected to the pair of LED circuit boards; a power source disposed within the hollow body; and a switch disposed on an outer surface of the hollow body and in electrical communication with the power source; and a camera mount attached to the hollow body.

Further to this embodiment the hollow body may comprise a brightness adjustment knob disposed on an outer surface of the hollow body and operably connected to the control board. In another further embodiment the hollow body may comprise a display disposed on an outer surface of the hollow body and operably connected to the control board. In yet another further embodiment the power source may be a rechargeable battery where the hollow body comprises a charging port disposed on an outer surface thereof and operably connected to the rechargeable battery.

In all embodiments the plurality of LEDs on one of the pair of the LED circuit boards may be different from the plurality of LEDs on the other of the pair of LED circuit boards. Particularly, the plurality of the LEDs may be plug-in lamp beads or patch lamp beads. Also in all embodiments the front light-transmitting surface and the back light-transmitting surface of the hollow body independently may be transparent or translucent. In addition the camera mount may be a pan-tilt cold shoe head comprising a male mounting foot. Furthermore, the hollow body may be made of an aluminum alloy.

Described herein is an on-camera light or double-sided light for a camera for optimizing light conditions during photography and videography. The on-camera light generally has a hollow body with front and back light-transmitting surfaces, a pair of light emitting diode (LED) circuit boards, for example, a first LED circuit board and a second LED circuit board, each comprising a plurality of LEDs disposed within the hollow body, a camera mount attached to the hollow body and means for operating the light. The placement of the LED circuit boards enables double-sided lighting and the camera mount enables the on-camera light to be panned or swiveled and/or tilted so that the LEDs on one or the other of the circuit boards may provide appropriate lighting during a photographic or a videographic opportunity.

The on-camera light has a compact structure. The hollow body may have any geometric shape, for example, a circular shape or a rectangular shape. Preferably the hollow body is substantially circular in shape. The front light-transmitting surface and the back light-transmitting surface may both be transparent, may both be translucent or may be a combination, i.e., one surface is transparent and the other is translucent.

Also, the hollow body may be made from any material including, but not limited to, a heat dissipating material such as a metal or metal alloy. For example the hollow body may be manufactured with an aluminum alloy shell that dissipates the heat generated by the LEDs thereby keeping the on-camera light cool during operation. A non-limiting example of an aluminum alloy is a high-strength aviation aluminum alloy material that ensures structural strength and heat dissipation to extend service life of the lamp.

The type of the LEDs on the first LED circuit board are different from the type of LEDs on the second LED circuit board. One circuit board may comprise a plurality of plug-in lamp beads and the other may comprise patch lamp beads for double-sided illumination. For example, DIP lamp beads and SMD lamp beads may be used on the pair of circuit boards.

A control board is secured within the hollow body and is electrically connected to the first and second LED circuit boards and to a power source also disposed within the hollow body of the on-camera light. The power source may be a built-in rechargeable battery, for example, but not limited to, preferably a lithium-ion battery, more preferably a lithium-ion polymer (LiPo) battery. A charging port is disposed on the outer surface of the hollow body and is operably connected to the rechargeable battery. For example, the charging port may be configured for constant current/constant voltage (CC/CV) charging suitable for lithium-ion batteries and lithium-ion polymer batteries. A switch on the outer surface of the hollow body is operably connected to the control board and to the power source and operates to turn on and turn off power to the LEDs. The switch enables the user to switch off power thereby extending the battery life.

A brightness adjustment knob is disposed on the outer surface of the hollow body and operably connected to the control board. The brightness adjustment knob enables the user to control the brightness of the light incident on the subject and/or scene. When combined with the pan-tilt, the brightness adjustment knob provides additional benefits of optimizing lighting conditions during photography and videography. A display, for example, a liquid crystal display (LCD) is disposed on the outer surface of the hollow body and operably connected to the control panel. The display may be configured to show, for example, but not limited to, brightness levels and/or the charge level of the battery during discharge and recharge.

The on-camera light comprises a camera mount fixedly attached or fixedly secured to the lower end of the hollow body. The camera mount may be a cold shoe head with a male mounting foot and a pan-tilt function as is known and standard in the art. The structure of the camera mount facilitates the installation of the on-camera light in a suitable position on a camera and ensures the stability of the light on the camera when panning, swiveling and or tilting the light. The camera mount enables removable attachment of the light to a camera for the purpose of lighting a subject or scene when taking a photograph or recording a video. The camera mount enables panning and tilting the on-camera light in a horizontal and vertical plane, respectively, with respect to the camera, thereby enabling optimal lighting.

The on-camera light embodied in this invention has several benefits over currently available lighting accessories. Firstly, the plug-in lamp beads offer the benefits of high brightness and a high color-rendering index (CRI). Secondly, the patch lamp beads, such as SMD lamp beads or RGB light can be App controlled via a smartphone or other smart device for adapting to different environments. Thirdly, the on-camera lights provided herein are light-weight, have a compact structure and include a built-in high-density lithium-ion battery, which enables longer use on a single charge. Fourthly, the use of a high-strength aluminum such as, for example, an aviation aluminum alloy, provides structural strength and good heat dissipation so that the lamp has a longer service life.

Particularly, embodiments of the present invention are better illustrated with reference to the Figure(s), however, such reference is not meant to limit the present invention in any fashion. The embodiments and variations described in detail herein are to be interpreted by the appended claims and equivalents thereof.

FIG. 1 is a front view of the on-camera light 1. The on-camera light has a hollow body 2 (see FIG. 5) comprising a front light transmitting surface 2a and a corresponding back light transmitting surface 2b (see FIG. 3). A camera mount 3 is attached to an outer surface 2c at the lower end 2d of the hollow body. The camera mount comprises a pan-tilt portion 3a and a cold shoe head 3b including a male mounting foot 3c.

Figures 2, 3:
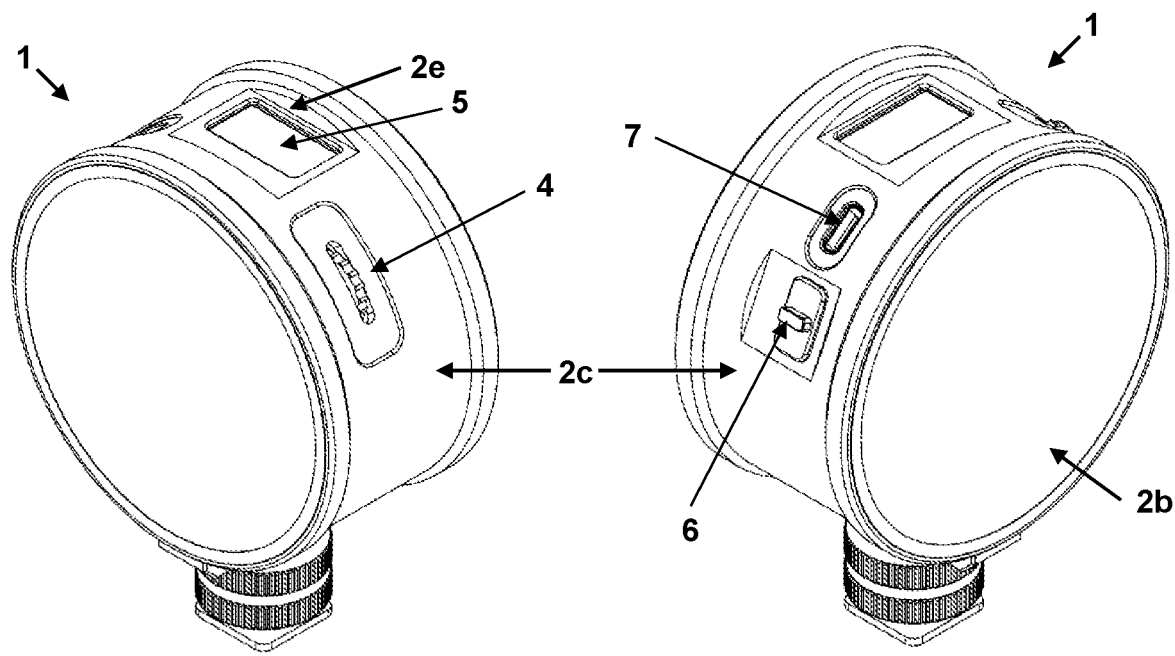
FIG. 2 shows the on-camera light with the brightness adjustment knob and display on the outer surface of the hollow body.
FIG. 3 shows the on-camera light with the switch and charging port on the outer surface of the hollow body.
Figure 4:
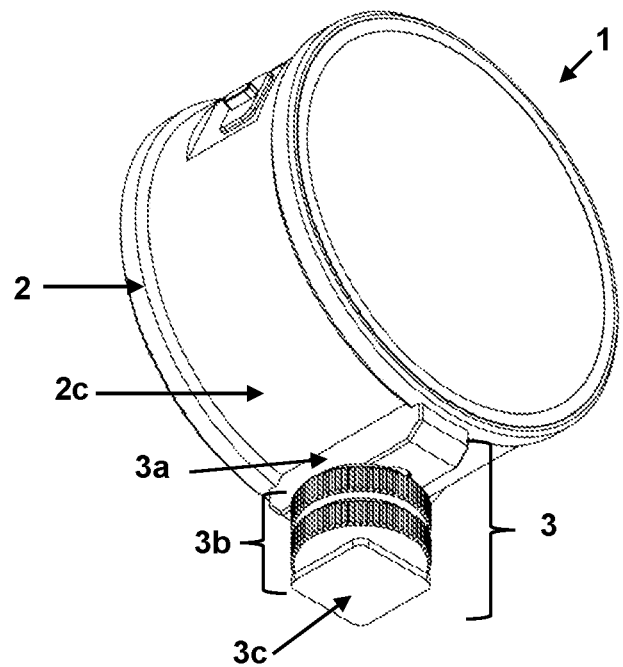
FIG. 4 shows the on-camera light with a perspective view of the camera mount attached on the outer surface of the hollow body.

FIG. 2 is a view of the on-camera light 1 showing a brightness adjustment knob 4 and a display 5 disposed on the outer surface 2c at the upper end 2e of the hollow body.

With continued reference to FIG. 2, FIG. 3 is a view of the on-camera light 1 showing the back light-transmitting surface 2b on the hollow body and a switch 6 and a charging port 7 operably disposed on the outer surface 2c.

With continued reference to FIGS. 1, 2 and 3, FIG. 4 is a view of the on-camera light 1 showing the placement of the pan-tilt portion 3a of the camera mount 3 on the outer surface 2c of the hollow body 2 in relation to the cold shoe head 3b including the male mounting foot 3c.

Figure 5:
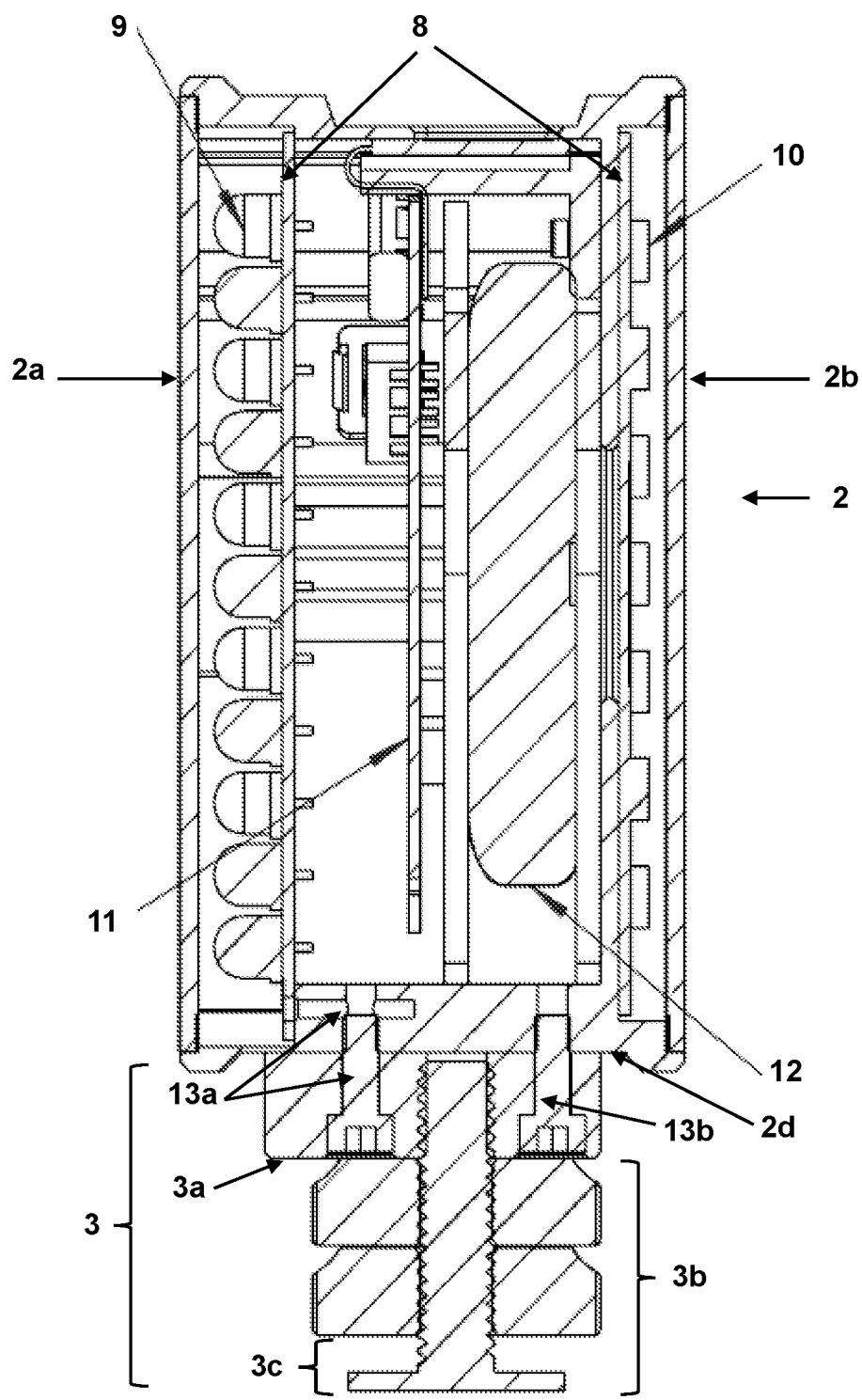
FIG. 5 is a cross-sectional view of the on-camera light.

With continued reference to FIG. 1, FIG. 5 is a cross-sectional view of the on-camera light 1. The view shows the placement, within the hollow body 2 of the pair of LED circuit boards 8 with a plurality of plug-in lamp beads 9 disposed on one of the circuit boards and proximate to the front light transmitting surface 2a and a plurality of patch lamp beads 10 disposed on the other of the circuit boards and proximate to the second back light transmitting surface 2b. The placement of the control board 11 in relation to the lithium-ion polymer battery 12 is illustrated. The pan-tilt portion 3a comprises tilt hinges 13a,b that extend into the lower end 2d of the hollow body 2 and illustrates how the pan-tilt mechanism can pan or swivel and tilt the on-camera light. The tilt hinges enable tilting the on-camera light from the vertical and panning or swiveling in a horizontal plane once the male mounting foot removably engages and secures the pan-tilt cold shoe head to a camera. The cross-sectional view illustrates how the male mounting foot 3c threadably secures the pan-tilt portion 3a and the cold shoe head 3b to the hollow body of the on-camera light.

What is claimed is:
1. An on-camera light, consisting of:
 a hollow body with a front light-transmitting cover and a back light-transmitting cover, each of said front light-transmitting cover and said back light-transmitting cover are independently transparent or translucent;
 a forward facing light emitting diode (LED) circuit board with a plurality of LEDs thereon placed within the hollow body behind the front light transmitting cover thereof;
 a rearward facing light emitting diode (LED) circuit board with a plurality of LEDs thereon placed within the hollow body behind the back light transmitting cover thereof;
 a pan-tilt cold shoe head attached to the hollow body;
 a control board removably secured within the hollow body and operably connected to the first LED circuit board and the second LED circuit board;
 a switch attached on an outer surface of the hollow body and operably connected to the control board;
 a brightness adjustment knob disposed on the outer surface of the hollow body and operably connected to the control board;

a display positioned on the outer surface of the hollow body and operably connected to the control board;

a rechargeable battery disposed within the hollow body and operably connected to the control board and to the switch; and a charging port disposed on the outer surface of the hollow body and operably connected to the rechargeable power source.

2. The on-camera light of claim 1, wherein the plurality of LEDs on the first LED circuit board is different from the plurality of LEDs on the second LED circuit board.

3. The on-camera light of claim 2, wherein the plurality of the LEDs comprise plug-in lamp beads or patch lamp beads.

4. The on-camera light of claim 1, wherein the hollow body has a substantially circular shape.

5. The on-camera light of claim 1, wherein the hollow body is made of an aluminum alloy.

6. A double-sided light for a camera, consisting of:

a hollow body substantially circular in shape with a front light-transmitting cover and a back light-transmitting cover that are each independently transparent or translucent;

a pair of light emitting diode (LED) circuit boards each with a plurality of LEDs thereon disposed within the hollow body such that one of the pair of LED circuit boards is placed forward facing therein behind the front light-transmitting cover and the other of the pair of LED circuit boards is placed rearward facing therein behind the back light-transmitting cover;

a control board disposed within the hollow body and operably connected to:

the pair of LED circuit boards;

a power source disposed within the hollow body;

a switch disposed on an outer surface of the hollow body and in electrical communication with the power source;

a brightness adjustment knob disposed on an outer surface of the hollow body; and a display disposed on an outer surface of the hollow body; and a pan-tilt cold shoe head with a male mounting foot thereon attached to the hollow body.

7. The double-sided light of claim 6, wherein the plurality of LEDs on one of the pair of the LED circuit boards is different from the plurality of LEDs on the other of the pair of LED circuit boards.

8. The double-sided light of claim 7, wherein the plurality of the LEDs on one of the pair of LED circuit boards are plug-in lamp beads and the plurality of LEDs on the other of the pair of LED circuit boards are patch lamp beads.

9. The double-sided light of claim 6, wherein the hollow body is made of an aluminum alloy.

\* \* \* \* \*